United States Patent
Gervais

(10) Patent No.: US 12,169,954 B2
(45) Date of Patent: Dec. 17, 2024

(54) NEURAL NETWORK COMBINING VISIBLE AND THERMAL IMAGES FOR INFERRING ENVIRONMENTAL DATA OF AN AREA OF A BUILDING

(71) Applicant: Distech Controls Inc., Brossard (CA)

(72) Inventor: Francois Gervais, Lachine (CA)

(73) Assignee: DISTECH CONTROLS INC., Brossard (CA)

( * ) Notice: Subject to any disclaimer, the term of this patent is extended or adjusted under 35 U.S.C. 154(b) by 1178 days.

(21) Appl. No.: 15/947,157

(22) Filed: Apr. 6, 2018

(65) Prior Publication Data

US 2019/0310589 A1 Oct. 10, 2019

(51) Int. Cl.
| | |
|---|---|
| G05B 13/04 | (2006.01) |
| F24F 11/63 | (2018.01) |
| G05B 13/02 | (2006.01) |
| G06V 10/143 | (2022.01) |
| G06V 10/764 | (2022.01) |
| G06V 10/82 | (2022.01) |
| G06V 20/10 | (2022.01) |
| H04N 5/33 | (2023.01) |

(52) U.S. Cl.
CPC ............ *G06V 10/143* (2022.01); *F24F 11/63* (2018.01); *G05B 13/027* (2013.01); *G06V 10/764* (2022.01); *G06V 10/82* (2022.01); *G06V 20/10* (2022.01); *H04N 5/33* (2013.01)

(58) Field of Classification Search
CPC ... G05B 13/027; F24F 11/63; G06K 9/00664; H04N 5/33
See application file for complete search history.

(56) References Cited

U.S. PATENT DOCUMENTS

| | | | |
|---|---|---|---|
| 5,555,512 A | 9/1996 | Imai et al. | |
| 8,742,680 B2 | 6/2014 | Cowburn | |
| 8,847,750 B1 | 9/2014 | Malakuti | |
| 9,137,878 B2 | 9/2015 | Thompson | |
| 10,573,134 B1* | 2/2020 | Zalewski | G07G 1/0072 |
| 2008/0172781 A1 | 7/2008 | Popowich et al. | |
| 2011/0307112 A1 | 12/2011 | Barrilleaux | |
| 2014/0139633 A1* | 5/2014 | Wang | G06K 9/00778 |
| | | | 348/46 |
| 2014/0375222 A1 | 12/2014 | Rains, Jr. et al. | |

(Continued)

*Primary Examiner* — Patrick E Demosky
(74) *Attorney, Agent, or Firm* — Buchanan Ingersoll & Rooney PC

(57) ABSTRACT

Method and computing device for inferring via a neural network environmental data of an area of a building based on visible and thermal images of the area. A predictive model generated by a neural network training engine is stored by the computing device. The computing device determines a visible image of an area based on data received from at least one visible imaging camera. The computing device determines a thermal image of the area based on data received from at least one thermal imaging device. The computing device executes a neural network inference engine, using the predictive model for inferring environmental data based on the visible image and the thermal image. The inferred environmental data comprise geometric characteristic(s) of the area, an occupancy of the area, a human activity in the area, temperature value(s) for the area, and luminosity value(s) for the area.

15 Claims, 8 Drawing Sheets

(56) References Cited

U.S. PATENT DOCUMENTS

| | | | |
|---|---|---|---|
| 2015/0310365 A1* | 10/2015 | Li | G06Q 10/063 |
| | | | 705/7.11 |
| 2016/0295208 A1* | 10/2016 | Beall | G06K 9/2018 |
| 2019/0187634 A1* | 6/2019 | Fan | F24F 11/65 |
| 2019/0303684 A1* | 10/2019 | Khadloya | G06V 10/82 |
| 2020/0167834 A1* | 5/2020 | Matsuoka | G06N 3/08 |
| 2020/0211154 A1* | 7/2020 | Ng | A61B 5/7275 |
| 2021/0356161 A1* | 11/2021 | Chen | G05B 19/042 |

* cited by examiner

NEURAL NETWORK COMBINING VISIBLE AND THERMAL IMAGES FOR INFERRING ENVIRONMENTAL DATA OF AN AREA OF A BUILDING

TECHNICAL FIELD

The present disclosure relates to the field of environment control systems. More specifically, the present disclosure relates to a computing device and method for inferring via a neural network environmental data of an area of a building based on visible and thermal images of the area.

BACKGROUND

Systems for controlling environmental conditions, for example in buildings, are becoming increasingly sophisticated. A control system may at once control heating and cooling, monitor air quality, detect hazardous conditions such as fire, carbon monoxide release, intrusion, and the like. Such control systems generally include at least one environment controller, which receives measured environmental characteristic values, generally from external sensors, and in turn determines set points or command parameters to be sent to controlled appliances.

A particular type of sensor consists of a camera for recording a visible image of an area of a building. Another particular type of sensor consists of a thermal imaging device (e.g. an infrared (IR) camera) for recording a thermal image of the area. Current advances in artificial intelligence, and more specifically in neural networks, are taken advantage of for processing one of the visible image or the thermal image to infer environmental data related to the area of the building. The inferred environmental data are then used (optionally in combination with other measured environmental characteristic value(s)) for determining the set points or command parameters. For example, a neural network uses the visible image as input for inferring geometric characteristic(s) of the area (e.g. surface, volume, height, etc.). The inferred geometric characteristic(s) of the area is used in combination with a measured temperature and/or a measured humidity of the area for determining commands and parameters for controlling a ventilation system.

In another example, a first neural network uses the visible image as input for inferring the number of persons present in the area. Alternatively, a second neural network uses the thermal image as input for inferring the number of persons present in the area. More accurate and reliable results can be obtained by combining the information extracted from the visible image and the information extracted from the thermal image for determining the number of persons present in the area. For example, output(s) of the first neural network are used in combination with the thermal image by post-processing means (e.g. a temperature distribution analysis software) for determining the number of persons present in the area. Alternatively, the output(s) of the second neural network are used in combination with the visible image by post-processing means (e.g. an image detection software) for determining the number of persons present in the area.

However, none of the aforementioned techniques takes into consideration the combination of a visible image and a thermal image as inputs of a single neural network.

Therefore, there is a need for a computing device and method for inferring via a neural network environmental data of an area of a building based on visible and thermal images of the area.

SUMMARY

According to a first aspect, the present disclosure relates to a computing device for inferring via a neural network environmental data of an area of a building based on visible and thermal images of the area. The computing device comprises memory for storing a predictive model generated by a neural network training engine, and a processing unit. The processing unit determines a visible image of an area based on data received from at least one visible imaging camera. The processing unit determines a thermal image of the area based on data received from at least one thermal imaging device. The processing unit executes a neural network inference engine using the predictive model for inferring environmental data based on the visible image and the thermal image.

According to a second aspect, the present disclosure relates to a method for inferring via a neural network environmental data of an area of a building based on visible and thermal images of the area. The method comprises storing a predictive model generated by a neural network training engine in a memory of a computing device. The method comprises determining, by a processing unit of the computing device, a visible image of an area based on data received from at least one visible imaging camera. The method comprises determining, by the processing unit, a thermal image of the area based on data received from at least one thermal imaging device. The method comprises executing, by the processing unit, a neural network inference engine using the predictive model for inferring environmental data based on the visible image and the thermal image.

According to a third aspect, the present disclosure relates to a non-transitory computer program product comprising instructions executable by a processing unit of a computing device. The execution of the instructions by the processing unit provides for inferring via a neural network environmental data of an area of a building based on visible and thermal images of the area by implementing the aforementioned method.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings.

Various aspects of the present disclosure generally address one or more of the problems related to the determination of environmental data of an area of a building based on visible and thermal images of the area. The determination is based on the usage of the neural network technology.

Terminology

The following terminology is used throughout the present disclosure:

Environment: condition(s) (temperature, humidity, pressure, oxygen level, carbon dioxide level, light level, security, etc.) prevailing in a controlled area or place, such as for example in a building.

Environment control system: a set of components which collaborate for monitoring and controlling an environment.

Environmental data: any data (e.g. information, commands) related to an environment that may be exchanged between components of an environment control system.

Environment control device (ECD): generic name for a component of an environment control system. An ECD may consist of an environment controller, a sensor, a controlled appliance, etc.

Environment controller: device capable of receiving information related to an environment and sending commands based on such information.

Environmental characteristic: measurable, quantifiable or verifiable property of an environment.

Environmental characteristic value: numerical, qualitative or verifiable representation of an environmental characteristic.

Sensor: device that detects an environmental characteristic and provides a numerical, quantitative or verifiable representation thereof. The numerical, quantitative or verifiable representation may be sent to an environment controller.

Controlled appliance: device that receives a command and executes the command. The command may be received from an environment controller.

Environmental state: a current condition of an environment based on an environmental characteristic, each environmental state may comprise a range of values or verifiable representation for the corresponding environmental characteristic.

VAV appliance: A Variable Air Volume appliance is a type of heating, ventilating, and/or air-conditioning (HVAC) system. By contrast to a Constant Air Volume (CAV) appliance, which supplies a constant airflow at a variable temperature, a VAV appliance varies the airflow at a constant temperature.

Area of a building: The expression 'area of a building' is used throughout the present specification to refer to the interior of a whole building or a portion of the interior of the building such as, without limitation: a zone, a floor, a room, an aisle, etc.

Figure 1:
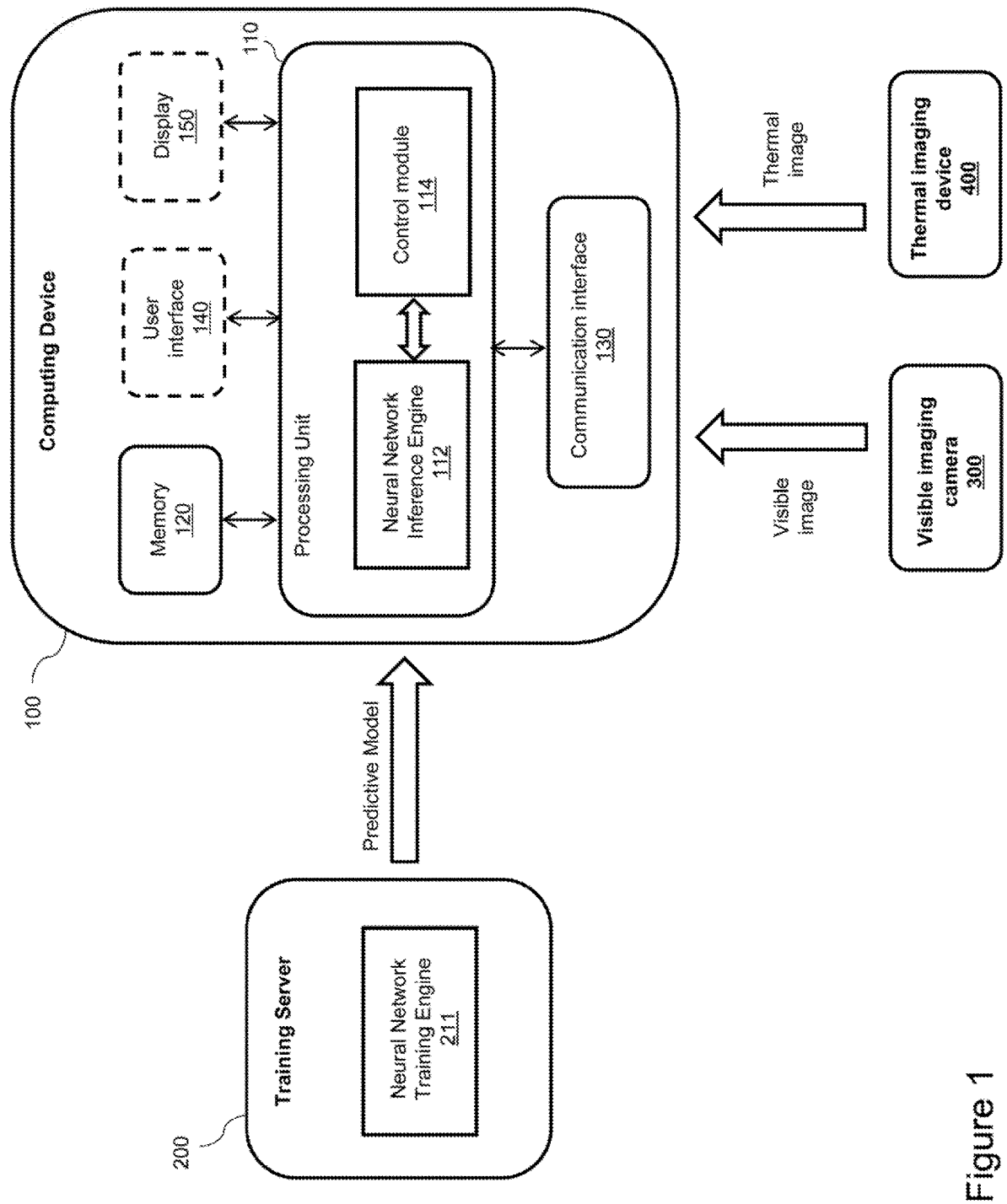
FIG. 1 illustrates a computing device capable of inferring via a neural network environmental data of an area of a building based on visible and thermal images of the area.
Figure 2:
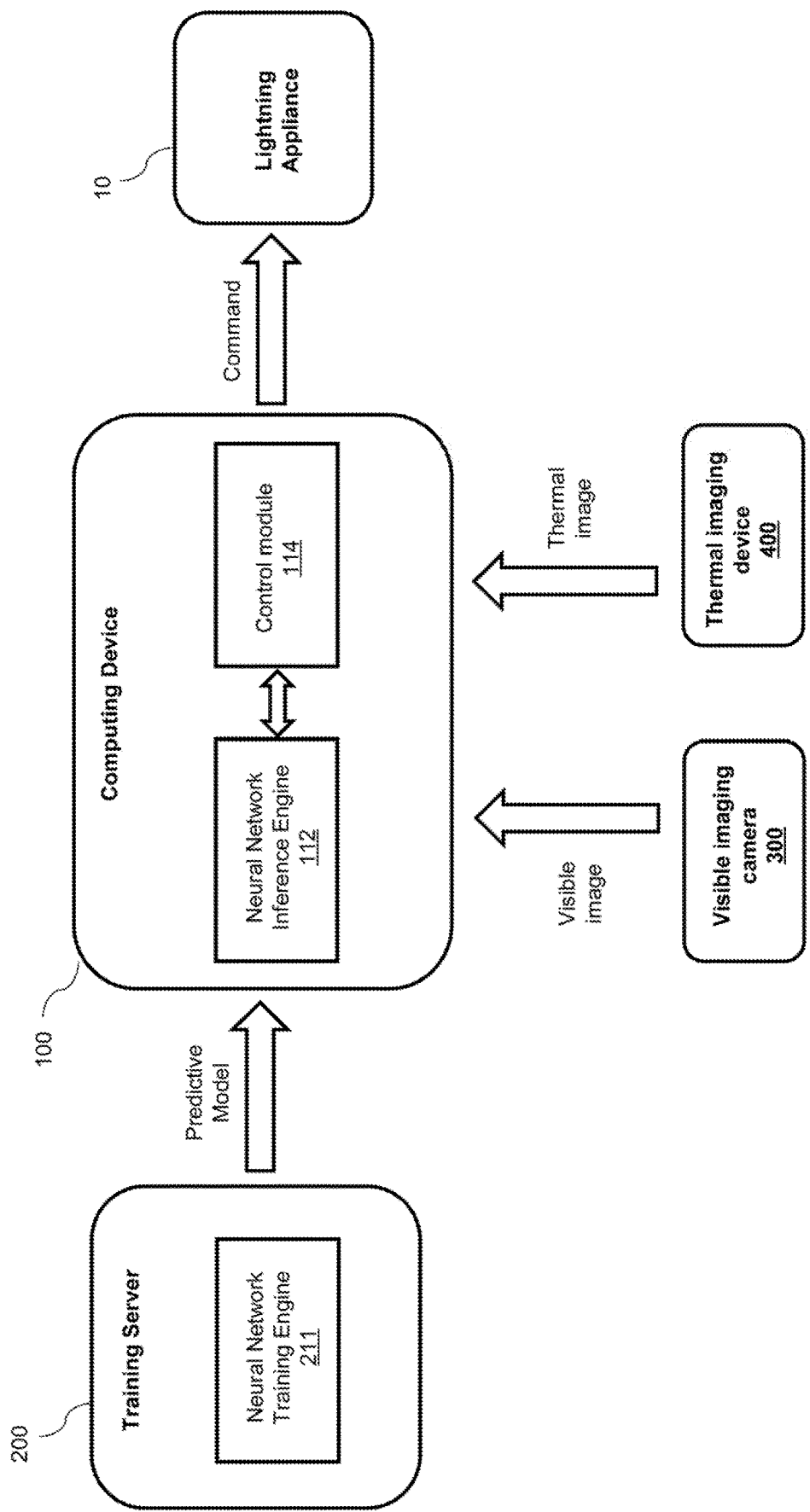
FIG. 2 illustrates the computing device of FIG. 1 controlling a lightning appliance.
Figure 3:
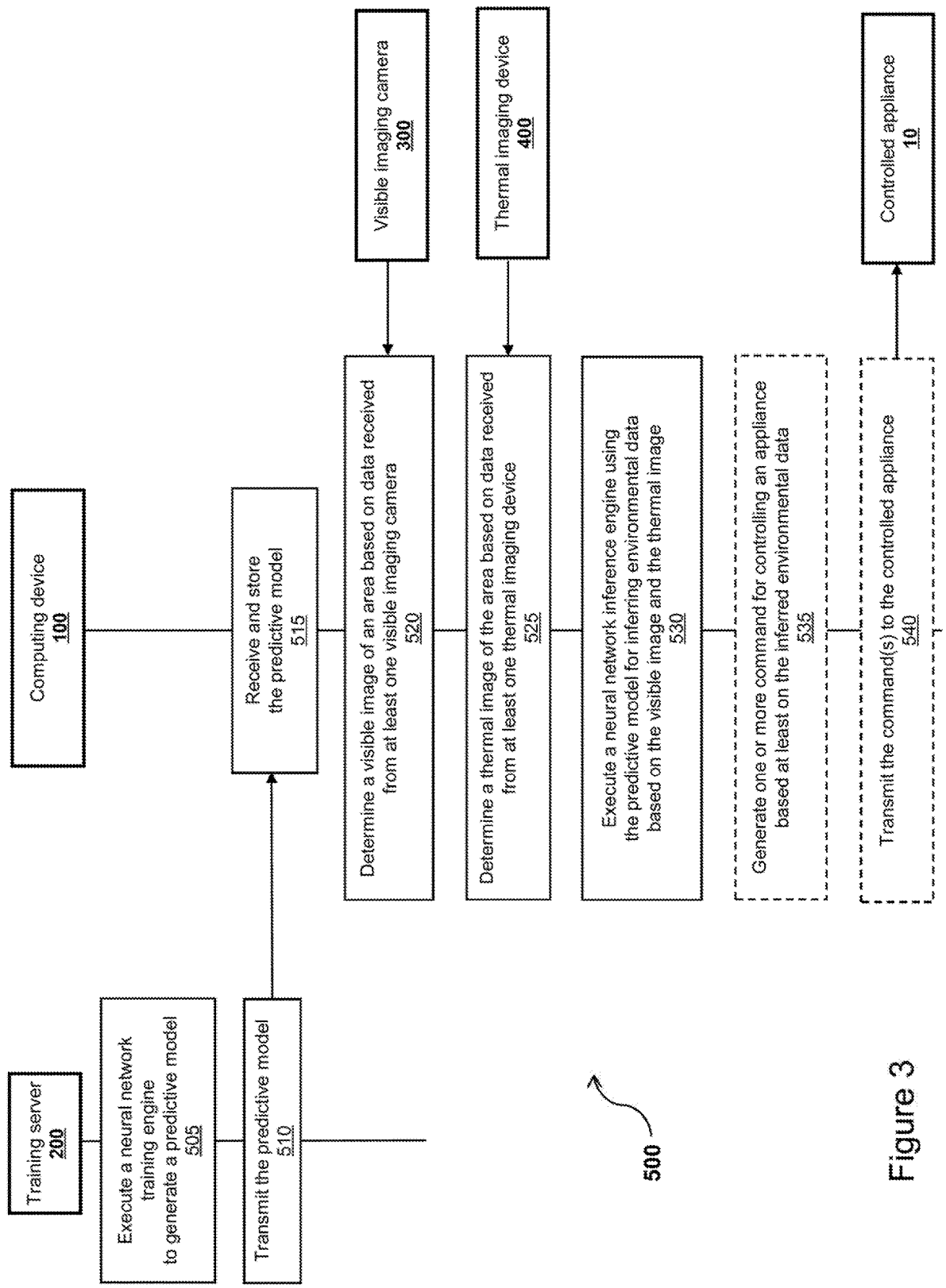
FIG. 3 illustrates a method implemented by the computing device of FIG. 1 for inferring via a neural network environmental data of an area of a building based on visible and thermal images of the area.

Referring now concurrently to FIGS. 1, 2 and 3, a computing device 100 (represented in FIGS. 1 and 2) and a method 500 (represented in FIG. 3) for inferring via a neural network environmental data of an area of a building based on visible and thermal images of the area are illustrated.

The computing device 100 comprises a processing unit 110, memory 120, a communication interface 130, optionally a user interface 140, and optionally a display 150. The computing device 100 may comprise additional components not represented in FIG. 1 for simplification purposes.

The processing unit 110 comprises one or more processors (not represented in FIG. 1) capable of executing instructions of a computer program. Each processor may further comprise one or several cores.

The memory 120 stores instructions of computer program(s) executed by the processing unit 110, data generated by the execution of the computer program(s), data received via the communication interface 130, data received via the optional user interface 140, etc. Only a single memory 120 is represented in FIG. 1, but the computing device 100 may comprise several types of memories, including volatile memory (such as a volatile Random Access Memory (RAM)) and non-volatile memory (such as a hard drive).

The communication interface 130 allows the computing device 100 to exchange data with several devices (e.g. a training server, a visible imaging camera 300, a thermal imaging device 400, etc.) over one or more communication network (not represented in FIG. 1 for simplification purposes). The term communication interface 130 shall be interpreted broadly, as supporting a single communication standard/technology, or a plurality of communication standards/technologies. Examples of communication interfaces 130 include a wireless (e.g. Wi-Fi, cellular, wireless mesh, etc.) communication module, a wired (e.g. Ethernet) communication module, a combination of wireless and wired communication modules, etc. In an exemplary configuration, the communication interface 130 of the computing device 100 has a first wireless (e.g. Wi-Fi) communication module for exchanging data with the visible imaging camera 300 and thermal imaging device 400, and a second wired (e.g. Ethernet) communication module for exchanging data with the training server 200.

At least some of the steps of the method 500 are implemented by the computing device 100, to infer via a neural network environmental data of an area of a building based on visible and thermal images of the area.

A dedicated computer program has instructions for implementing at least some of the steps of the method 500. The instructions are comprised in a non-transitory computer program product (e.g. the memory 120) of the computing device 100. The instructions provide for inferring via a neural network environmental data of an area of a building based on visible and thermal images of the area, when executed by the processing unit 110 of the computing device 100. The instructions are deliverable to the computing device 100 via an electronically-readable media such as a storage media (e.g. CD-ROM, USB key, etc.), or via communication links (e.g. via a communication network through the communication interface 130).

The dedicated computer program executed by the processing unit 110 comprises a neural network inference engine 112 and a control module 114.

Also represented in FIG. 1 is the training server 200. Although not represented in FIG. 1 for simplification purposes, the training server 200 comprises a processing unit, memory and a communication interface. The processing unit of the training server 200 executes a neural network training engine 211.

The execution of the neural network training engine 211 generates a predictive model, which is transmitted to the computing device 100 via the communication interface of the training server 200. For example, the predictive model is transmitted over a communication network and received via the communication interface 130 of the computing device 100.

Also represented in FIG. 1 is the visible imaging camera 300. The visible imaging camera 300 is a regular camera for capturing images in the visible spectrum, referred to as visible images. The visible images transmitted by the visible imaging camera 300 may be pre-processed by the control module 114, before being used as inputs by the neural network inference engine 112. For example, the pre-processing comprises reducing the resolution of the visible images, enhancing the contrast of the visible images, extracting a pre-defined portion of the visible images, averaging a plurality of consecutive visible images into an averaged visible image (which is used as input by the neural network inference engine 112), etc. Furthermore, although a single visible imaging camera 300 is represented in the Figures, several visible imaging cameras 300 may be operating in parallel for covering an area of the building having a large extension (e.g. an open-space). A set of visible images respectively captured by the plurality of visible imaging cameras 300 is combined and pre-processed, to generate a global visible image of the area, which is used as input by the neural network inference engine 112.

Also represented in FIG. 1 is the thermal imaging device 400. The thermal image device 400 is a device for capturing images in a non-visible spectrum, referred to as thermal images. The thermal images are representative of the temperature at a plurality of positions within the area. For example, the thermal imaging device 400 is an infra-red (IR) camera. The thermal images transmitted by the thermal imaging device 400 may be pre-processed by the control module 114, before being used as inputs by the neural network inference engine 112. For example, the pre-processing comprises reducing the resolution of the thermal images, enhancing the contrast of the thermal images, extracting a pre-defined portion of the thermal images, averaging a plurality of consecutive visible images into an averaged visible image (which is used as input by the neural network inference engine 112), etc. Furthermore, although a single thermal imaging device 400 is represented in the Figures, several thermal imaging devices 400 may be operating in parallel for covering an area of the building having a large extension (e.g. an open-space). A set thermal images respectively captured by the plurality of thermal imaging devices 400 is combined and pre-processed, to generate a global thermal image of the area, which is used as input by the neural network inference engine 112.

The area of the building is not represented in FIG. 1 for simplification purposes. As mentioned previously, the area may consist of a room, an aisle, etc. The computing device 100, the visible imaging camera 300 and the thermal imaging device 400 are located in the area. Alternatively, the computing device 100 is located outside of the area and remotely controls the area based on images transmitted by the visible imaging camera 300 and the thermal imaging device 400.

In a first implementation, the functionalities described in the present disclosure are implemented by an environment controller. The computing device 100 is an environment controller capable of controlling controlled appliance(s) based on environmental characteristic values transmitted by sensors. The sensors include the visible imaging camera 300 and thermal imaging device 400. The controlled appliance is not represented in FIG. 1. For example, the controlled appliance is a lightning appliance, a VAV appliance, etc. The environment controller 100 generates commands for controlling the controlled appliance based solely on the environmental data inferred from the visible and thermal images respectively transmitted by the visible imaging camera 300 and thermal imaging device 400. Alternatively, additional sensors transmit additional environment characteristic values (e.g. humidity level, carbon dioxide ($CO_2$) level, etc.) to the environment controller 100. The commands generated by the environment controller 100 are based on a combination of the environmental data inferred from the visible and thermal images and the additional environment characteristic values.

In a second implementation, the computing device 100 transmits the environmental data inferred from the visible and thermal images to a remote environment controller. The remote environment controller uses the inferred environmental data (optionally in combination with additional environment characteristic values collected from additional sensors) to generate commands for controlling one or more controlled appliances.

FIG. 2 illustrates an example of a controlled appliance consisting of a lightning appliance 10 under the control of the computing device 100. The neural network inference engine 112 uses the predictive model to infer the environmental data based on inputs comprising the visible image and the thermal image. The control module 114 generates one or more commands for controlling the lightning appliance based on the inferred environmental data; and transfers the one or more commands to the lightning appliance 10.

The method 500 comprises the step 505 of executing the neural network training engine 211 (by the processing unit of the training server 200) to generate the predictive model.

The method 500 comprises the step 510 of transmitting the predictive model to the computing device 100, via the communication interface of the training server 200.

The method 500 comprises the step 515 of receiving the predictive model and storing the predictive model in the memory 120 of the computing device 100. The predictive model is received via the communication interface 130 of the computing device 100 and stored in the memory 120 by the processing unit 110.

The method 500 comprises the step 520 of determining the visible image of the area based on data received from at least one visible imaging camera 300. For example, the visible image of the area is received from a single visible imaging camera 300. Alternatively, the visible image is the combination of the outputs of a plurality of visible imaging cameras 300. Step 520 is performed by the control module 114 executed by the processing unit 110.

The method 500 comprises the step 525 of determining the thermal image of the area based on data received from at least one thermal imaging device 400. For example, the thermal image of the area is received from a single thermal imaging device 400. Alternatively, the thermal image is the combination of the outputs of a plurality of thermal imaging devices 400. Step 525 is performed by the control module 114 executed by the processing unit 110.

The visible image and the thermal image are received by the processing unit 110 via the communication interface 130. Alternatively, at least one of the visible imaging camera 300 or the thermal imaging device 400 is integrated to the computing device 100. In this case, the corresponding image is directly transferred from the visible imaging camera 300 or thermal imaging device 400 to the processing unit (e.g. through an internal communication bus of the computing device 100).

The method 500 comprises the step 530 of executing the neural network inference engine 112 (by the processing unit 110). The neural network inference engine 112 uses the predictive model (stored in memory 120 at step 515) for inferring the environmental data, based on the visible image and the thermal image. The visible image and the thermal image are the only inputs of the neural network inference engine 112. Alternatively, additional parameter(s) are further used as inputs of the neural network inference engine.

The method 500 comprises the optional step 535 of generating one or more command for controlling an appliance. The generation of the one or more command is based at least on the environmental data inferred at step 530. Step 535 is performed by the control module 114 executed by the processing unit 110.

The method 500 comprises the step 540 of transmitting the one or more commands to the controlled appliance 100 via the communication interface 130. Step 540 is performed by the control module 114 executed by the processing unit 110.

Although not represented in FIG. 3 for simplification purposes, the method 500 further comprises an optional step consisting in applying by the controlled appliance 10 the one or more commands received from the computing device 100. For example, the controlled appliance 10 is a lightning appliance. The application of the one or more commands by the lightning appliance 10 results in increasing or decreasing the luminosity in the area of the building.

Several types of environmental data are inferred based on the visible image only, the thermal image only and the combination of the visible and thermal images.

One or more geometric characteristic of the area is inferred based on the visible image only. Examples of the one or more geometric characteristic of the area include the type of area (e.g. a closed room, an aisle, an open-space, etc.). Alternatively or complementarily, examples of the one or more geometric characteristic of the area include dimensions of the area (e.g. volume, surface, height, length, width, etc.).

An occupancy of the area is inferred based on the combination of the visible and thermal images. A basic inference of the occupancy consists in determining whether the area is occupied or not (by persons). A more sophisticated inference of the occupancy consists in determining the number of persons present in the area.

A (human) activity in the area is inferred based on the combination of the visible and thermal images. The human activity in the area defines the type of activity performed by the persons occupying the area. For instance, the human activity in the area is defined by a type of area. Types of areas include an office area, a passing area (e.g. an aisle) a storage area, a workshop area, etc. Alternatively, the human activity in the area is defined by a posture of the persons present in the area. Types of postures include sitting (some of the persons present in the area are sitting), walking (some of the persons present in the area are walking), acting (some of the persons present in the area are performing a physical activity (different from just walking)), etc.

One or more inferred temperature value of the area is inferred based on the thermal image only. Examples of the one or more inferred temperature value of the area include an average temperature of the area, a plurality of average temperatures for a corresponding plurality of sub-sections of the area, an average temperature near a person present in the area, a plurality of average temperatures near a corresponding plurality of persons present in the area, etc. The terminology inferred temperature value is used for clarification purposes, to differentiate a temperature value inferred by the neural network inference engine 112 from a temperature measured by the thermal imaging device 400 (and comprised in the thermal image).

One or more luminosity value for the area is inferred based on the visible image only. For instance, the luminosity value is a luminance measured in lux. Examples of the one or more luminosity value for the area include an average luminosity value of the area, a plurality of average luminosity values for a corresponding plurality of sub-sections of the area, an average luminosity value near a person present in the area, a plurality of average luminosity values near a corresponding plurality of persons present in the area, etc.

The predictive model used by the neural network inference engine 112 is adapted for receiving the visible and thermal images as inputs; and for outputting the environmental data as outputs. The predictive model includes the number of layers of the neural network, the number of nodes (also referred to as neurons) per layer, and the weights associated to each node. The first layer of nodes receives the inputs and the last layer of nodes calculates the outputs.

The visible image is represented by a three dimensions matrix. If the visible image has a width W and a height H, then it is represented by a $W*H*3$ matrix. The last dimension comprises three RGB (Red, Green and Blue) values, each one of the three RGB values being in the range 0-255.

The thermal image is represented by a two dimensions matrix. If the thermal image has a width W and a height H, then it is represented by a $W*H$ matrix. Each element in the matrix is a temperature measured by the thermal imaging device.

The combination of the visible and thermal images is represented by a three dimensions $W*H*4$ matrix. The last dimension comprises the three RGB values and the temperature. The first layer of the neural network comprises $W*H*4$ nodes for receiving all the data of the matrix.

The visible and thermal images may have different widths and/or heights. In this case, a pre-processing software processes at least one of the visible and thermal images, so that the common three dimensions matrix with the same width W and height H for the visible and thermal images can be used. The pre-processing may consist in replacing the RGB values and/or temperature values for several adjacent pixels by a single averaged value, dropping the RGB values and/or temperature values of certain pixels according to a filtering pattern, etc.

With respect to the number of nodes of the last layer of the neural network, it depends on the environmental data being outputted by the neural network. One or more node of the last layer is used for each one of the geometric characteristic(s), occupancy, activity, inferred temperature value(s) and luminosity value(s). For example, if the geometric characteristics consist of the volume, surface and height of the area, then the last layer comprises three nodes respectively dedicated to the calculation of the volume, surface and height. If the occupancy consists of the number of persons present in the area, then the last layer comprises one node dedicated to the calculation of the number of persons. If the activity consists of the posture (e.g. sitting, walking or acting) of the persons in the area, then the last layer comprises one node dedicated to the determination of the posture. If the inferred temperature value consists of the average temperature of the area, then the last layer comprises one node dedicated to the calculation of the average temperature. If the luminosity values consist of N average luminosity values in N corresponding sub-sections of the area, then the last layer comprises N nodes respectively dedicated to the calculation of the average luminosity value in each sub-section. For example, N=4 and the area is divided in 4 sub-sections of equal size. In another example, N=9 and the area is divided in 9 sub-sections of equal size.

Some of the outputted environmental values only depend on one of the inputted visual image or thermal image. More specifically, the geometric characteristic(s) and luminosity value(s) only depend on the visible image. The inferred temperature value(s) only depend(s) on the thermal image. It is well known in the art that during the training phase, the neural network training engine 211 is capable of generating a predictive model where some of the outputs depend on the all the inputs, while other outputs only depend on a subset of the inputs.

Ideally, a single predictive model is used by the neural network inference engine 112 for inferring all the environmental data (geometric characteristic(s), occupancy, activity, inferred temperature value(s) and luminosity value(s)).

However, it may be experimentally determined that more than one single predictive model shall be used by the neural network inference engine 112. For example, a first predictive model is used for a first subset of the inferred environmental data, and a second predictive model is used for a second complementary subset of the inferred environmental data. This is the case if it is experimentally determined that it is more effective in terms of processing power and/or memory usage to sequentially execute the neural network inference engine 112 with respectively the two (simpler) predictive models, instead of executing the neural network inference engine 112 with the single (more complex) predictive model. This is also the case if it is experimentally determined that more accurate results are obtained when using the two (simpler) predictive models instead of the single (more complex) predictive model.

Each of the two complementary predictive models use both the visible and thermal images as inputs. The outputs of one of the complementary predictive models includes the occupancy, and at least one of the geometric characteristic(s), inferred temperature value(s) and luminosity value(s). The outputs of the other one of the complementary predictive models includes the activity, and at least one of the geometric characteristic(s), inferred temperature value(s) and luminosity value(s).

Step 530 (optionally 535 and 540) is repeated if new images are received at steps 520 (a new visible image) and/or 525 (a new thermal image. For example, the computing device 100 is programmed to perform step 530 on a regular basis (e.g. every minute, every five minutes, etc.). The visible imaging camera 300 and thermal imaging device 400 are programmed to send data in synchronization with the execution of step 530 (e.g. every minute, every five minutes, etc.). If the visible imaging camera 300 and/or the thermal imaging device 400 cannot be programmed, additional data received between two executions of step 530 are simply dropped.

The mechanism disclosed in the present disclosure takes advantage of the neural network technology, to infer the environmental data during an operational phase (step 530), based on a predictive model generated during a training phase (step 505).

A first type of data used as inputs of the neural network training engine 211 (during the training phase) and the neural network inference engine 112 (during the operational phase) consists of the visible images.

A second type of data used as inputs of the neural network training engine 211 (during the training phase) and the neural network inference engine 112 (during the operational phase) consists of the thermal images.

The output(s) of the neural network training engine 211 (during the training phase) and the neural network inference engine 112 (during the operational phase) consists of the environmental data.

During the training phase, the neural network training engine 211 is trained with a plurality of combination of inputs (each combination of inputs comprises a visible image and a thermal image) and a corresponding plurality of combination of outputs (each corresponding combination of outputs comprises the environmental data). As is well known in the art of neural network, during the training phase, the neural network implemented by the neural network training engine 211 adjusts its weights. Furthermore, during the training phase, the number of layers of the neural network and the number of nodes per layer can be adjusted to improve the accuracy of the model. At the end of the training phase, the predictive model generated by the neural network training engine 211 includes the number of layers, the number of nodes per layer, and the weights.

The inputs and outputs for the training phase of the neural network are collected through an experimental process. Several reference areas having varying characteristics are used for the training. Visible imaging cameras and thermal imaging devices are deployed in the reference areas for collecting the visible images and thermals images used as inputs during the training phase. The reference areas have varying geometric characteristics (e.g. type of area, dimensions of the area). Additionally, the following parameters are varied experimentally in each reference area: occupancy, activity, temperature value(s) and luminosity value(s). Thus, for each reference area, a plurality of combinations of training outputs (geometric characteristic(s), occupancy, activity, temperature value(s), luminosity value(s)) are measured and collected by a person in charge of the training. Some of these operations may be automated, for example by using temperature and luminosity sensors for measuring the temperatures and luminosity values used for the training.

As mentioned previously, one or more predictive models may be used by the neural network inference engine 112. If a single predictive model is used, it is generated as follows during the training phase. For each reference area, a plurality of input combinations [visible image, thermal image] and a corresponding plurality of output combinations [geometric characteristic(s), occupancy, activity, temperature value(s), luminosity value(s)] are used for the generation of the single predictive model by the neural network training engine 111.

If two predictive models are used, they are generated as follows during the training phase. For each reference area, a plurality of input combinations [visible image, thermal image] and a first corresponding plurality of output combinations (e.g. [geometric characteristic(s), occupancy, luminosity value(s)]) are used for the generation of the first predictive model by the neural network training engine 111. Simultaneously, a second corresponding plurality of output combinations (e.g. [activity, temperature value(s)]) are used for the generation of the second predictive model by the neural network training engine 111.

Various techniques well known in the art of neural networks are used for performing (and improving) the generation of the predictive model, such as forward and backward propagation, usage of bias in addition to the weights (bias and weights are generally collectively referred to as weights in the neural network terminology), reinforcement training, etc.

During the operational phase, the neural network inference engine 112 uses the predictive model (e.g. the values of the weights) determined during the training phase to infer outputs (the environmental data) based on inputs (a visible image and a thermal image), as is well known in the art.

Figure 4:
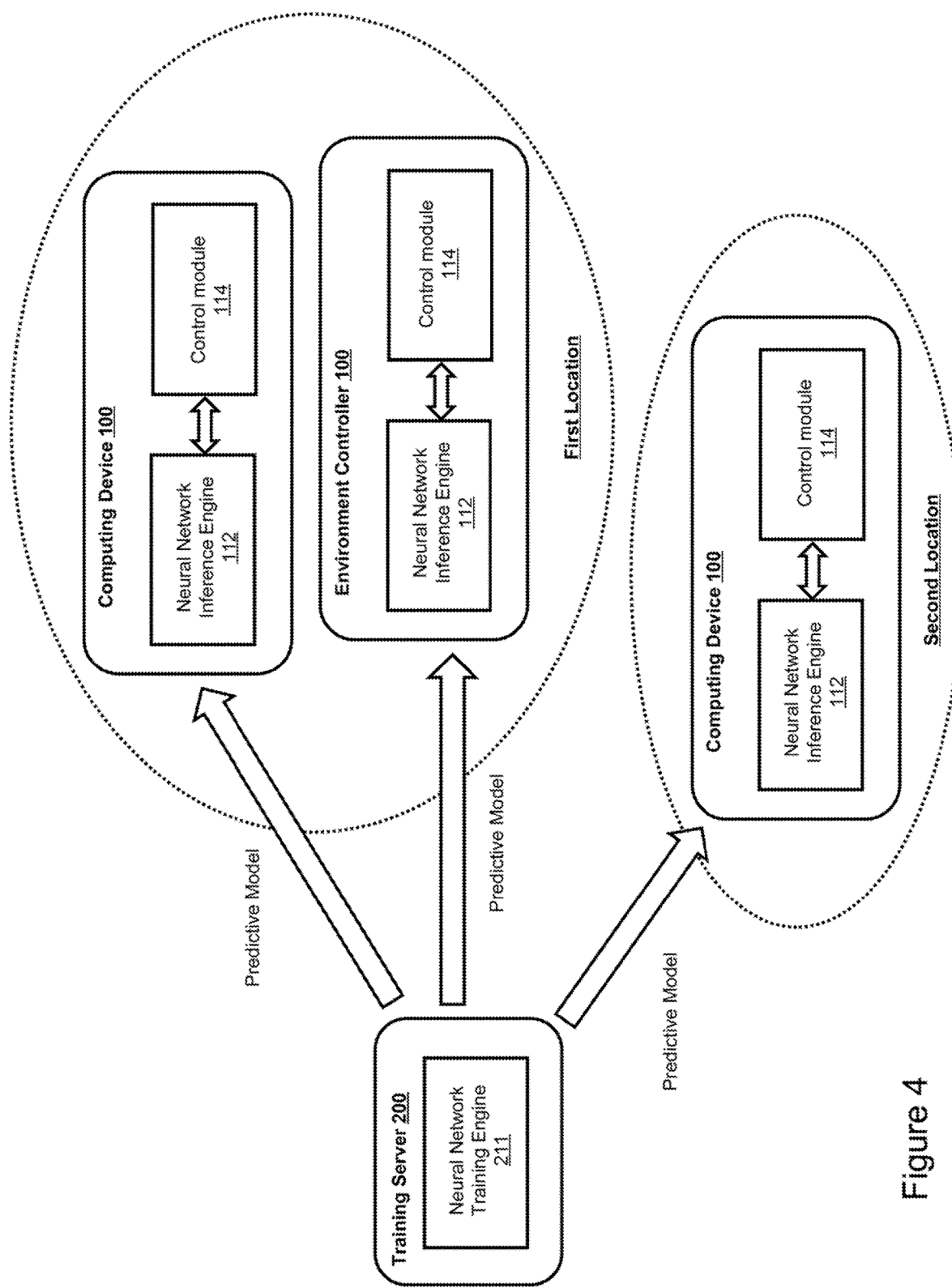
FIG. 4 represents an environment control system where several computing devices implementing the method illustrated in FIG. 3 are deployed.

Reference is now made concurrently to FIGS. 1, 2, 3 and 4, where FIG. 4 illustrates the usage of the method 500 in a large environment control system.

A first plurality of computing devices 100 implementing the method 500 are deployed in different areas at a first location. Only two computing devices 100 are represented for illustration purposes, but any number of computing devices 100 may be deployed. The different areas are not represented for simplification purposes.

A second plurality of computing devices 100 implementing the method 500 are deployed in different areas at a second location. Only one computing device 100 is represented for illustration purposes, but any number of computing devices 100 may be deployed. The different areas are not represented for simplification purposes.

The first and second locations consist of different buildings, different floors of the same building, etc. Each area where a computing device 100 is deployed is a room, an allay, an open space in one of the first or second location. Only two locations are represented for illustration purposes, but any number of locations may be considered.

Each computing device 100 represented in FIG. 4 determines visible images based on data received from at least one visible imaging camera 300 and determines thermal images based on data received from at least one thermal imaging device 400, as illustrated in FIG. 1.

The computing devices 100 correspond to the computing devices represented in FIG. 1; and execute both the control module 114 and the neural network inference engine 112. Each computing device 100 receives a predictive model from the centralized training server 200 (e.g. a cloud-based training server 200 in communication with the computing devices 100 via a networking infrastructure, as is well known in the art). The same predictive model is used for all the computing devices 100. Alternatively, a plurality of predictive models is generated, and takes into account specific operating conditions of the computing devices 100. For example, a first predictive model is generated for computing devices 100 located in a closed room, a second predictive model is generated for computing devices 100 located in an aisle, and a third predictive model is generated for computing devices 100 located in a large open space.

As mentioned previously, several predictive models may be used (instead of a single one) by at least one of the computing devices 100. The several predictive models are generated by the neural network training engine 211 and transmitted from the training server 200 to at least one of the computing devices 100.

FIG. 4 illustrates a decentralized architecture, where the computing devices 100 autonomously execute the neural network inference engines 112 for inferring environmental data based on the collected visible and thermal images, using the predictive model as illustrated in the method 500.

In an alternative centralized architecture not represented in the Figures, the neural network inference engine 112 may be executed by a processing unit of a dedicated inference server serving a plurality of computing devices 100. At least some of the steps of the method 500 (in particular 515 and 530) are performed by the inference server. The computing device 100 collects the visible and thermal images; and transmits them to the inference server. The inference server performs the inference of the environmental data based on the visible and thermal images using the adequate predictive model. The inference server transmits the inferred environmental data to the computing device, where they are further used to control appliances (e.g. steps 535 and 540 of the method 500).

The centralized inference server may be used in the case where some of the computing devices 100 do not have sufficient processing power and/or memory capacity for executing the neural network inference engine 112. The centralized inference server is a powerful server with high processing power and memory capacity capable of executing a neural network inference engine 112 using a complex predictive model (e.g. multiple layers with a large number of neurons for some of the layers). The centralized inference server is further capable of executing several neural network inference engines 112 in parallel for serving a plurality of computing devices in parallel.

Figure 5A:
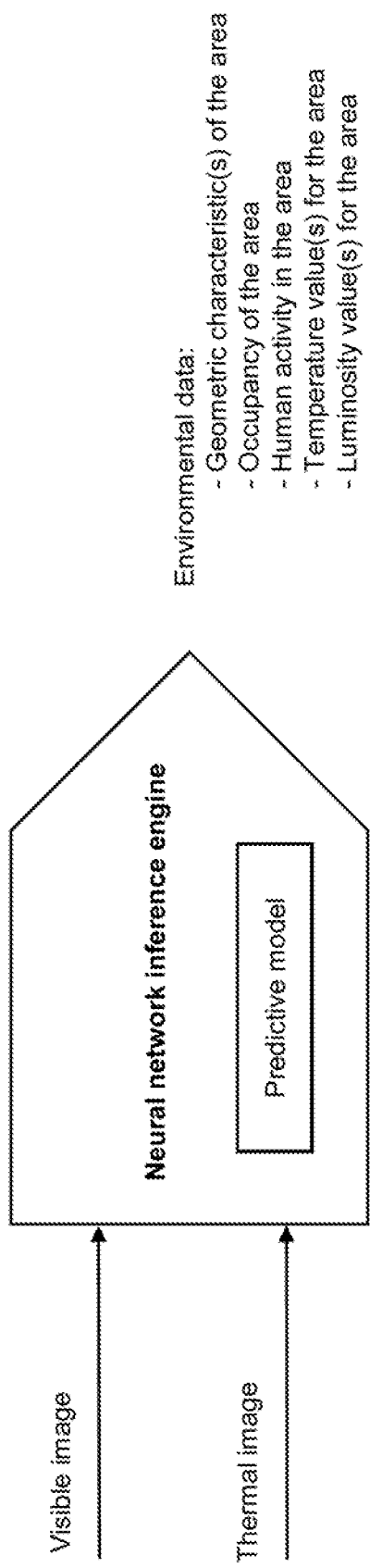
FIGS. 5A and 5B are schematic representations of a neural network inference engine executed by the computing device of FIGS. 1 and 2.

Reference is now made to FIG. 5A, which illustrates the aforementioned neural network inference engine with its inputs and its outputs. FIG. 5A corresponds to the neural network inference engine 112 executed at step 530 of the method 500, as illustrated in FIGS. 1 and 3. As mentioned previously, the outputs consist of the environmental data. The environmental data comprise at least a subset of the following data: geometric characteristic(s) of the area, occupancy of the area, human activity in the area, temperature value(s) for the area, and luminosity value(s) for the area.

Figure 5B:
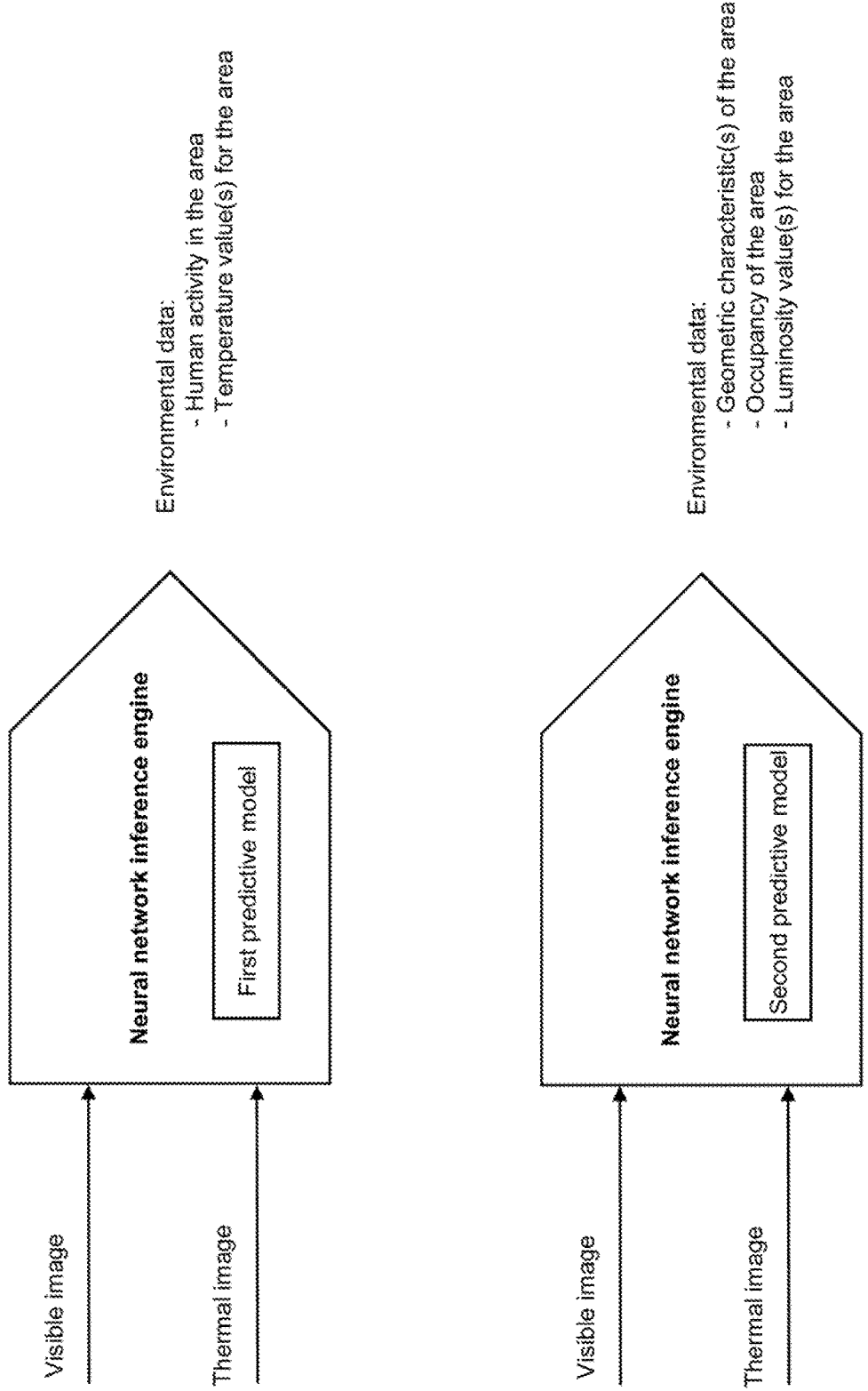

Reference is now made to FIG. 5B, which illustrates an exemplary implementation using two independent predictive models. As mentioned previously, several predictive models may be used instead of a single one. Each one of the predictive models is used by the neural network inference engine for inferring a subset of the environmental data. The inference of the human activity and the temperature value(s) is based on a first predictive model. The inference of the geometric characteristic(s), the occupancy and the luminosity value(s) is based on a second predictive model.

Figure 6A:
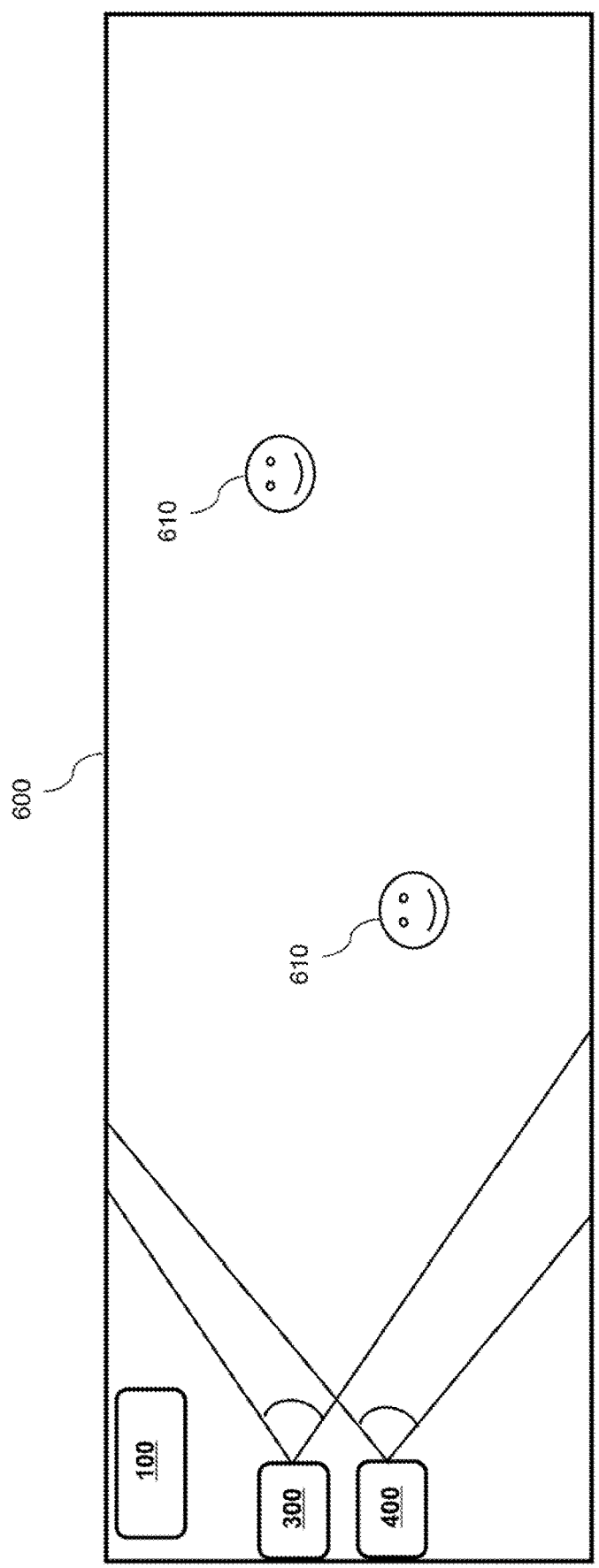
FIGS. 6A and 6B illustrate two examples of areas where the computing device of FIG. 1 is deployed.

Reference is now made to FIG. 6A, which illustrates an exemplary area 600 of a building. The area 600 consists of an aisle on a floor of a building. The surface of the aisle 600 is rectangular, with its length substantially higher than its width.

A computing device 100 corresponding to the computing device 100 represented in FIG. 1 and implementing the method 500 represented in FIG. 3 is installed at one extremity of the aisle 600. A visible imaging camera 300 with a wide angle of vision is located at the extremity of the aisle, to cover substantially the integrality of the aisle 600. A thermal imaging device 500 with a wide angle of vision is also located at the extremity of the aisle, to cover substantially the integrality of the aisle 600. The visible imaging camera 300 and thermal imaging device 400 respectively transmit a visible image and a thermal image of the aisle 600 to the computing device 100 (e.g. via a Wi-Fi network covering the aisle 600).

The computing device 100 infers the following environmental data based on the transmitted visible and thermal images. The computing device 100 infers the type of the area 600: an aisle. The computing device 100 further infers an estimated surface of the aisle 600 and an estimated height of the aisle 600. The computing device 100 infers that two persons 610 are present in the aisle 600. The computing device 100 further infers that the two persons 610 are currently walking in the aisle 600. The computing device 100 also infers an average temperature and an average luminosity of the aisle 600.

The environmental data inferred by the computing device 100 have been selected among the previously described inferable environmental data (geometric characteristic(s), occupancy, human activity, temperature value(s) and luminosity value(s)); and are for illustration purposes only.

Figure 6B:
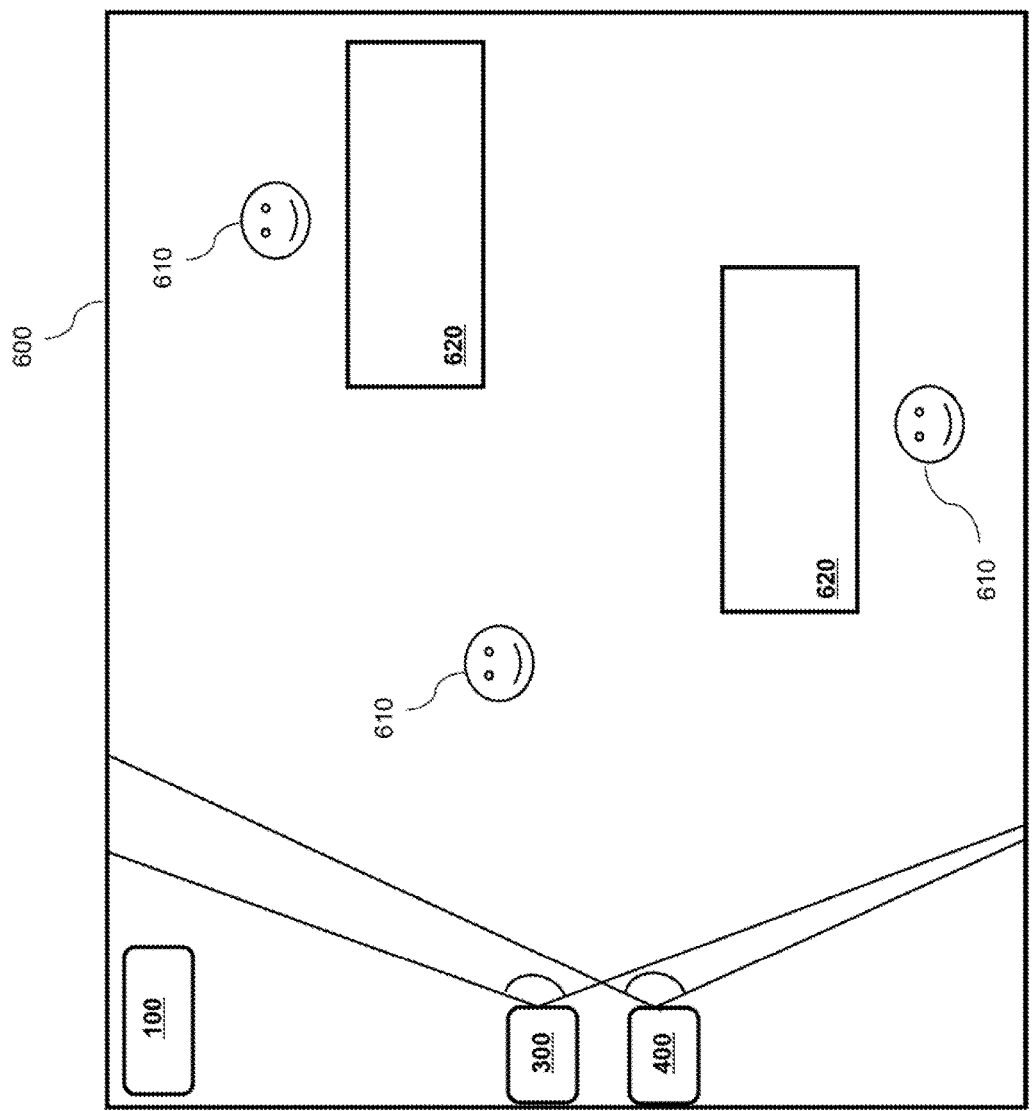

Reference is now made to FIG. 6B, which illustrates another exemplary area 600 of a building. The area 600 consists of an office on a floor of a building. The surface of the office 600 is rectangular, with its length substantially equal to its width.

A computing device 100 corresponding to the computing device 100 represented in FIG. 1 and implementing the method 500 represented in FIG. 3 is installed at one extremity of the office 600. A visible imaging camera 300 with a wide angle of vision is located at the extremity of the office, to cover substantially the integrality of the office 600. A thermal imaging device 500 with a wide angle of vision is also located at the extremity of the office, to cover substantially the integrality of the office 600. The visible imaging camera 300 and thermal imaging device 400 respectively transmit a visible image and a thermal image of the office 600 to the computing device 100 (e.g. via a Wi-Fi network covering the office 600).

The computing device 100 infers the following environmental data based on the transmitted visible and thermal images. The computing device 100 infers the type of the area 600: closed room. The computing device 100 further infers an estimated surface of the office 600 and an estimated height of the office 600. The computing device 100 infers that three persons 610 are present in the office 600. The computing device 100 further infers that one of the three persons 610 is currently walking in the office 600, while two of the three persons 610 are currently sitting (at a desk 620). The computing device 100 also infers an average temperature of the office 600. The computing device 100 further infers an average luminosity near the two persons 610 sitting at the desks 620.

The environmental data inferred by the computing device 100 have been selected among the previously described inferable environmental data (geometric characteristic(s), occupancy, human activity, temperature value(s) and luminosity value(s)); and are for illustration purposes only.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A computing device for inferring via a neural network environmental data of an area inside a building based on visible and thermal images of the area, the computing device comprising:
   memory for storing a predictive model of the neural network generated by a neural network training engine; and
   a processing unit for:
      determining a visible image of an area inside a building based on data received from at least one visible imaging camera;
      determining a thermal image of the area inside the building based on data received from at least one thermal imaging device; and
      executing a neural network inference engine using the predictive model of the neural network for inferring outputs based on inputs, the outputs comprising a number of persons currently present in the area and at least one of the following: at least one current temperature value for the area, and at least one current luminosity value for the area, the inputs comprising the visible image and the thermal image.

2. The computing device of claim 1, wherein the outputs further comprise at least one of the following: at least one geometric characteristic of the area, and a human activity in the area.

3. The computing device of claim 1, wherein the outputs further comprise a human activity in the area, the human activity in the area comprising at least one of the following: a type of the area and a posture of persons present in the area.

4. The computing device of claim 1, wherein the processing unit further generates one or more commands for controlling a controlled appliance based at least on the inferred outputs of the neural network inference engine.

5. The computing device of claim 1, wherein the predictive model of the neural network comprises weights used by the neural network inference engine.

6. A method for inferring via a neural network environmental data of an area inside a building based on visible and thermal images of the area, the method comprising:
   storing a predictive model of the neural network generated by a neural network training engine in a memory of a computing device;
   determining by a processing unit of the computing device a visible image of an area inside a building based on data received from at least one visible imaging camera;
   determining by the processing unit a thermal image of the area inside the building based on data received from at least one thermal imaging device; and
   executing by the processing unit a neural network inference engine using the predictive model of the neural network for inferring outputs based on inputs, the outputs comprising a number of persons currently present in the area and at least of the following: at least one current temperature value for the area, and at least one current luminosity value for the area, the inputs comprising the visible image and the thermal image.

7. The method of claim 6, wherein the outputs further comprise at least one of the following: at least one geometric characteristic of the area, and a human activity in the area.

8. The method of claim 6, wherein the outputs further comprise a human activity in the area, the human activity in the area comprising at least one of the following: a type of the area and a posture of persons present in the area.

9. The method of claim 6, wherein the processing unit further generates one or more commands for controlling a controlled appliance based at least on the inferred outputs of the neural network inference engine.

10. The method of claim 6, wherein the predictive model of the neural network comprises weights used by the neural network inference engine.

11. A non-transitory computer program product comprising instructions executable by a processing unit of a computing device, the execution of the instructions by the processing unit providing for inferring via a neural network environmental data of an area inside a building based on visible and thermal images of the area by:
   storing a predictive model of the neural network generated by a neural network training engine in a memory of the computing device;
   determining by the processing unit of the computing device a visible image of an area inside a building based on data received from at least one visible imaging camera;
   determining by the processing unit a thermal image of the area inside the building based on data received from at least one thermal imaging device; and
   executing by the processing unit a neural network inference engine using the predictive model of the neural network for inferring outputs based on inputs, the outputs comprising a number of persons currently present in the area and at least one of the following: at least one current temperature value for the area, and at least one current luminosity value for the area, the inputs comprising the visible image and the thermal image.

12. The computer program product of claim 11, wherein the outputs further comprise at least one of the following: at least one geometric characteristic of the area, and a human activity in the area.

13. The computer program product of claim 11, wherein the outputs further comprise a human activity in the area, the human activity in the area comprising at least one of the following: a type of the area and a posture of persons present in the area.

14. The computer program product of claim 11, wherein the processing unit further generates one or more commands for controlling a controlled appliance based at least on the inferred outputs of the neural network inference engine.

15. The computer program product of claim 11, wherein the predictive model of the neural network comprises weights used by the neural network inference engine.

\* \* \* \* \*